US006317675B1

United States Patent
Stölzl et al.

(10) Patent No.: US 6,317,675 B1
(45) Date of Patent: Nov. 13, 2001

(54) ELECTROMECHANICAL BRAKE SYSTEM

(75) Inventors: Stefan Stölzl, Weinheim; Bernhard Giers, Frankfurt; Rainer Oehler, Darmstadt; Peter Willimowski, Bruchköbel; Jürgen Böhm, Oberneisen; Joachim Nell, Hanau; Oliver Hoffmann, Frankfurt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/554,778
(22) PCT Filed: Nov. 20, 1998
(86) PCT No.: PCT/EP98/07448
  § 371 Date: Sep. 21, 2000
  § 102(e) Date: Sep. 21, 2000
(87) PCT Pub. No.: WO99/26820
  PCT Pub. Date: Jun. 3, 1999

(30) Foreign Application Priority Data

Nov. 22, 1997 (DE) ............................. 197 51 906
Nov. 18, 1998 (DE) ............................. 198 53 036

(51) Int. Cl.[7] ........................................ B60T 7/12
(52) U.S. Cl. .................. 701/76; 701/70; 303/155; 303/DIG. 4
(58) Field of Search .............................. 701/76, 70, 71; 303/155, DIG. 2, DIG. 3, DIG. 4

(56) References Cited

U.S. PATENT DOCUMENTS 5,954,407  *  9/1999  Schramm et al. ................... 303/155

FOREIGN PATENT DOCUMENTS

| 40 29 334 | 3/1992 | (DE). |
| 43 43 314 | 6/1995 | (DE). |
| 195 09 133 | 10/1995 | (DE). |
| 195 23 108 | 11/1996 | (DE). |
| 195 29 434 | 2/1997 | (DE). |
| 196 17 285 | 8/1997 | (DE). |
| 95 13946 | 5/1995 | (WO). |
| 97 06487 | 2/1997 | (WO). |
| 98 36956 | 8/1998 | (WO). |

OTHER PUBLICATIONS

Search Report of the German Patent Office for Application No. 198 53 036.6.

* cited by examiner

Primary Examiner—William A. Cuchlinski, Jr.
Assistant Examiner—Yonel Beaulieu
(74) Attorney, Agent, or Firm—Rader, Fishman & Grauer PLLC

(57) ABSTRACT

An electromechanical brake system, particularly for motor vehicles, with a pedal simulator and brake modules is disclosed. A central module is also provided. The connection between the aforesaid modules can be provided by a data bus. The central module evaluates the braking request signals from a sensor device and checks them for errors. Also, a central module supplies and appropriate desired braking value based on the braking request and possibly higher functions such as ABS or ASR. The desired braking value is then conveyed on to the brake module, which then determines the corresponding control signals for the actuators, which interact with the wheels in order to brake the vehicle as the driver requires.

17 Claims, 1 Drawing Sheet

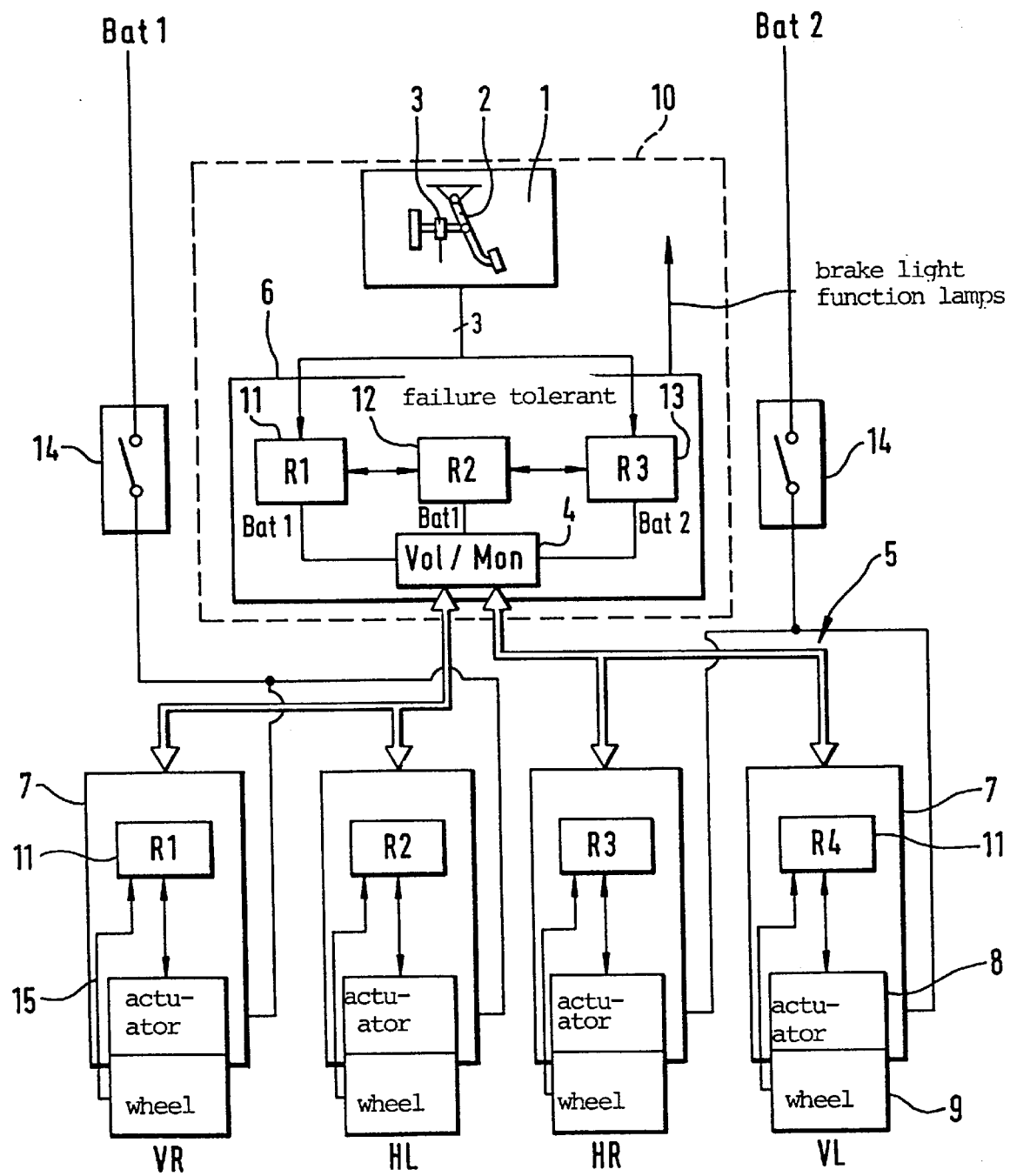

ELECTROMECHANICAL BRAKE SYSTEM

TECHNICAL FIELD

The present invention generally relates to vehicle brakes and more particularly relates to an electromechanical brake system and a process for controlling an electromechanical brake system.

BACKGROUND OF THE INVENTION

The investigation of electrical brake systems is part of the development of modern brake technology. The hydraulic cylinder which in present-day systems presses the brake lining against the brake disc is replaced here, at each disc, by a highly efficient electric motor. The electric brake does not need any mechanical or hydraulic parts, as a vacuum brake power booster or a tandem master cylinder does. Moreover, the electric brake can take over other functions currently handled by a brake, and future ones as well, such as those of an anti-blocking system (ABS), a traction aid or anti-slip regulator (ASR), an electronic stability program (ESP), or an automatic intervention by the brakes such as can be provided for in distance-control systems.

One example for such a system is shown in WO 95/13946. This so-called electronic brake system displays a central module and another module allocated to the brake circuits or wheel component groups. The central module in this case can carry out ABS and ASR calculations, adjust the distribution of the braking force, and calculate the required brake pressure specifically for each wheel.

A micro-processor system is known from DE 195 29 434 A1 (P7959) in which two synchronized central units receive the same input information and handle it with the same programs on one or a number of chips. The two central units are connected via separate bus systems to the fixed-value and the write-read memories, and also to input and output units.

The bus systems are connected to one another by driver levels and bypasses which make it possible for the two central units jointly to read and process the data made available to them, including check-data and commands. This system makes it possible to save memory space. Only one of the two central units is connected to a full-scale fixed-value and a write-read memory, whilst the memory capacity of the second processor is limited to memory space for check-data, but access to all data is possible via the bypasses, so this means that both central units are each able to process the complete program.

In patent applications DE 197 16 197 A1 (P9009) and DE 197 20 618 A1 (P9018), micro-processor systems are described for regulating those aspects that are critical to safety and are equipped to process the one program with at least three central units, if possible all arranged on one chip. There are also fixed-value memories and write-read memories with additional memory spaces for check-data, input and output units, and comparison units which check the output signals from the central units to ensure that they tally. The central units are connected to one another via bus systems which make it possible for the central units to read and process the incoming data jointly, including the check-data and commands, on the basis of the same program.

The central units in this already familiar system are enlarged to make two complete control signal circuits and wired up in such a way that, if one fails, a majority decision enables the defective central unit to be recognized and an emergency function to be maintained.

Finally, a wiring arrangement is known from DE 197 17 686 A1 which is likewise suitable for a safety-critical control system and is constructed as two or more circuits, with each circuit containing a complete micro-processor system which processes the incoming data redundantly and supplies a fault-recognition signal if a fault or a deviation occurs between the data-processing results obtained redundantly. If a fault is recognized, the system switches over to an emergency function in which either the circuit is switch off or the actuators are handled by both the circuits of the intact micro-processor system. The two systems are provided with their own periphery, consisting of signal registration, actuator operation, and energy supply (7,8).

DE 195 10 525 A1 discloses a process for controlling or regulating the brake system of a motor vehicle in which a brake pedal actuation by the driver is registered by at least two measuring devices for two different values and by which the braking request of the driver is determined by means of the registered signals and changed into required values for wheel brakes and which controls or regulates the wheel brakes whereby the braking request of the driver is formed by at least two values independently from one another and is then further processed.

In the present invention, the basic objective is to create an electromechanical brake system and a procedure for controlling an electromechanical brake system, especially for motor vehicles, which is reliable but also inexpensive in construction and needs only limited expenditure of time and money in its installation.

The invention is based on the idea that, when a wiring arrangement of the type described above is used that is suitable for safety-critical regulation systems, designed with in-built redundancy, and capable of running in emergency mode, the operating safety required for a brake-by-wire system can also be guaranteed. It is possible to do without redundancy in the computer module that serves to control the individual wheel modules. Redundancy can then also be dispensed with for the bus systems that connect the control circuit(s) with the wheel modules. The state of the wheel module is monitored with at least one signal that provides information on the wheel rotation behavior, and in the event of a fault the wheel module can be transferred to the safe state via a switch-off path.

In this invention, an electromechanical brake system, especially for motor vehicles, can contain a pedal simulator for redundantly registering when the driver uses the brake pedal by means of a suitable sensor system. Also, a central module can be provided which calculates the desired braking value on the basis of output signals. In addition to this, at least one brake module can be provided to control at least one wheel brake, with the control being based on the desired braking value. In addition to this, a data transfer unit is provided which creates a data link between the central module and the brake module in which the central module can display a fault-recognition circuit capable of discovering a fault in the calculation of the desired braking value.

An important point is that the central module must be capable of running in emergency mode and can thus make a vital contribution to the required high level of operating safety of the system.

The central module can take higher functions into account in calculating the desired braking value, and can also display at least three redundant computers which calculate the desired braking value on the basis of the output signals from the sensor system. Higher functions of the brake system such as ABS, ASR, and ESP can also be implemented on at least two of these redundant computers in the central module.

According to this invention, the wheel brake modules and the wheel brakes can both function as individual systems with a simple interface and offer a low-costs total system. This applies particularly if the central module is integrated into the pedal simulator. Moreover, with the system architecture of this invention it is possible, without suffering any additional disadvantage such as increased cabling or reduced freedom from interference, to install a double or TT circuit division. The installation cost for the car manufacturer is minimal and the cabling cost only very slight. In addition to this, clear and simple interfaces are provided in the central module and the wheel modules to make the whole system easy to test and to reduce the complexity of communications between the individual modules. With short analog wiring and a highly efficient amplifier, fitted close to the actuator, a high level of active and passive suppression can be achieved. This invention also enables a very low level of "degradation"—loss of function—to be achieved in the event of a fault, and sensors make it impossible for safety-critical tension to affect one brake, whether the driver intends to brake or not, as a result of a fault in any one computer, the functional electronics, or the actuator.

BRIEF DESCRIPTION OF THE DRAWINGS

FIG. 1 shows a schematic block wiring diagram corresponding to a preferred embodiment of this invention.

The illustration shows a pedal simulator 1 with a schematically indicated brake pedal 2. The brake pedal 2, or alternatively the movement of brake pedal 2, can for instance be registered by a sensor system 3, which displays at least three sensors, such as two travel and one force sensor. The output signals from this sensor system 3 can be analog, but it is also conceivable that the sensor system could issue some or all digital signals, or other signals, or other dimensions.

Each of these output signals is sent to a central module 6, e.g. via separate circuits, and picked up there in separate measurement channels. These measurement channels can display analog/digital converters (not shown in the figure), which convert analog into digital signals.

However, it is also conceivable that the redundant signals from the pedal simulator 1 are simply transferred to the central module 6 and there each divided into at least two measurement channels. If, for instance, three pedal sensors are used, it is advantageous to lead the signals onto three separate measurement channels or three separate display analog/digital converters (assuming the pedal sensors issue analog sensors), in which case at least two of the computers 11, 12, 13 in the central module 6 will receive the converted data. As a result, these two computers in the central module 6 will receive identical input data.

It should be noted at this point that the data transmitted by pedal simulator 1 can be faulty. The data consolidation, meaning the recognition of defective sensors or hardware, including the amplified or the A/D converter, and the calculation of the desired braking value, is done in central module 6.

A data bus 5 is also provided which connects the central module 6 to two each of the brake modules 7, in which case brake module 7 contains one pair of actuators and one pair of wheels 8,9. Each of these pairs 8,9 is then allocated to a vehicle wheel (VR=front right, VL=front left, HR=rear right, and HL=rear left).

The following paragraphs now give a functional description by way of an example of the system architecture of the kind shown in the diagram.

In summary, the invention involve architecture redundancy and safety concepts for electromechanical brake systems (brake-by-wire). This brake system contains the pedal simulator 1 with the redundant sensor system 3, a triple-redundant central module 6, and four wheel brake modules 7. The wheel brake modules 7 consist of a computer 11 (R1, R2, R3, R4), an electronic system, an actuator 8, actuator-specific sensors, and one allocated wheel 9. The central module 6 and the wheel modules 7 are connected with at least one data bus 5. The central module 6 is integrated into a housing 10 in the pedal simulator 1.

The driver's decision to brake is communicated by pedal simulator 1, for instance via the sensors described above, in which case the sensors are preferably designed to be redundant and dissimilar, for instance to detect pedal travel or the force exerted by the foot. As has already been described, only these sensor signals can be transmitted, singly or double, to the central module 6. The signals are distributed in this case to at least two measurement channels, so that redundancy can be achieved here as well.

The central module 6 can initially be provided in such a way that all the functions (the basic braking function, monitoring the pedal simulator 1, and the higher braking functions) are the same in all the computers 11, 12, 13 of the central module 6 (this embodiment is not illustrated in the figure). The results obtained by the three computers are sent via a fault-tolerant voter/monitor structure as a faultless output value.

This provides a fault-tolerant structure for these functions.

As is shown in the diagram, a dissimilar sub-division can also be achieved in the central module 6. In this case, the higher functions such as ABS, ASR, and ESP are implemented on only two of the computers, 11, 13. The handling of the basic braking functions and the monitoring of the pedal simulator 1 can be implemented on all three computers, 11, 12, 13. All three computers, 11, 12, 13, have access to at least two separate measurement channels (not illustrated).

The higher functions are monitored by a comparison unit (not illustrated), and in the event of a fault these functions are switched off in the computers 11, 13, which creates a "fail-silent" function. It should be noted in particular that, if a fault occurs in the handling of the higher functions, it is of course not always necessary to shut down the whole of computers 11, 13; it can be sufficient to deactivate only the part of the program that is affected. The results of the pedal function, i.e. the handling of the basic braking function without any interference from the higher functions, is consolidated and monitored by the voter/monitor 4. In the event of the failure of the higher functions, the desired braking value is issued directly to brake module 7 without any interference from the higher functions.

If a fault occurs only in the area of the higher functions, there will still be the three computers 11, 12, 13 available for the basic braking function, but if any one of the three computers 11, 12, 13 is defective it can be isolated by the voter/monitor 4 and switched off. The voter 4 would, for instance, select a desired braking value from the three outputs of the computers 11, 12, 13. The monitor would then check to see whether the selected signal deviates from the non-selected signals, by being worse or wrong, and would select a different signal from the selected one if it detects a deviations.

There is no necessity to switch off two of the computers 11, 12, 13 in the event of a fault. The reliability of the brake system is thus equal to or greater than with the computer structure with the same sub-division, see above. This applies of course in connection with the provision of two power supply sources, Bat1 and Bat2. If three power supply sources are used, a further increase in redundancy could be achieved for the same sub-division (see above). The brake modules 7 consist of a brake module computer 11 (R1, R2, R3, R4) in the electronic system, the actuator 8 with its actuator-specific sensors for such readings as the actuator current, voltage, and position, and a switch-off unit 14 which can be tested and regulates the voltage supply of actuator 8.

The external switch-off unit 14 ensures that a fault in the electronic system cannot affect the switch-off function.

Redundancy is not necessary within the wheel module 7 because this is monitored by the central module 6. If the wheel module 7 itself perceives a fault, e.g. through the electronic monitoring of the actuator control unit, an additional actuator control unit can be excluded by the appropriate control of the electronic system in wheel module 7.

The central module 6 can monitor the state of wheel module 7 via the return-message circuit coming from the wheel module. It is advantageous here to use a bus structure such as CAN.

Central module 6 can be used for monitoring wheel sensor systems that cannot be influenced by wheel module 7 through faults; for instance, the braking torque can be monitored with the aid of an r.p.m.-transmitter.

For these reasons, no redundancy is necessary in wheel module 7 in its connections to the wheel module. It is only necessary to have suitable devices available serving the central module 6 to switch off the output path to one or a number of wheel modules.

The brake module computer on brake module 7 does not need to be designed for fail-safe, because brake module 7 fulfils its specified function or, in the case of a fault, switches off automatically and reports the fault; alternatively, in the case of a computer fault it keeps still (fail-silent). The central module 6 is available as the monitoring level.

It should also be noted here that each of the brake modules 7 can also be used for two actuator/wheel pairs 8,9 (this would then be a circuit module).

The data bus 5 is produced at least as a single version, and connected to two wheel modules 7 and to module 6.

At least two independent sources of energy are necessary, Bat1 and Bat2. In the case of the brake modules 7, they can be sub-divided as shown in the figure, diagonally, or in a front-and-rear layout.

It can be said in summary that according to the present invention there is no loss of function in the event of a fault, or if there is that it will be very slight. Only in the event of one of the energy supply sources, Bat1 or Bat2, or a short-circuit affecting all the bus circuits to the two wheel modules 7, that two brakes can fail. This would then be a circuit failure. Otherwise, only one of the brake modules 7 would be affected at a time, or at the most the higher functions could fail if there were a failure within central module 6, and even then the basic braking function would still be completely intact. If the sub-division of the functions is the same for all three computers, 11, 12, 13, in the central module 6, the result of a computer fault would be no loss of function at all. In the event of a bus failure, the brakes of the relevant actuator/wheel pair 8, 9 would fail.

The system architecture is configured in such a way that, for instance, a fault could never result in only the rear wheel brakes being available. The system architecture allows a high brake delay in all fault conditions.

Also, the system architecture under this invention guarantees that no fault can propagate itself. A fault can be recognized before it has any effect on other functions or modules. Also, there is a high level of electromagnetic compatibility because interference radiation is kept to a minimum. The electronic system for controlling the actuators 8 is integrated into the relevant wheel module 7 and installed on or close to the relevant actuator 8. In addition to this, resistance to interference is also very high, particularly if central module 6 is installed close to or on the pedal simulator, because then the analog signal transmission route is short.

It should also be noted that the functions, systems, and modules under this invention and described above are covered, all together and in any combination, alone or in their entirety, by this invention.

What is claimed is:

1. An electromechanical brake system for motor vehicles, comprising:

a registration device for registering any braking request by a driver by means of a suitable sensory system, a central module for calculating a desired braking value based on output signals from the sensory system, at least one brake module for controlling at least one wheel brake based on the desired braking value, and a data transmission unit which creates a data link between the central module and the brake module wherein the central module includes a fault-recognition circuit which can recognize faults in the calculation of the desired braking value, wherein the central module includes means for accounting for higher functions of the brake system, wherein sad higher functions of the brake system are selected from the group consisting of ABS, ASR, ESP, ICC, brake assistants, and hill-holder.

2. A brake system according to claim 1, wherein the central module contains a plurality of micro-processor systems, capable of operating independently of one another and of operating in emergency mode.

3. A brake system according to claim 1, wherein the central module, when calculating the desired braking value, takes into account higher functions of the brake system.

4. A brake system according to claim 1, wherein the central module is integrated into a housing for a pedal simulator.

5. A brake system according to claim 1, wherein the central module carries out data consolidation to recognize any malfunction in a pedal simulator or the central module.

6. A brake system according to claim 1, wherein the central module includes three redundant computers which calculate the desired braking value on the basis of the pedal functions and additionally that the higher functions of the brake system are implemented on at least two of these redundant computers.

7. A brake system according to claim 6, wherein at least two independent sources of energy are provided and that each of these sources of energy supplies at least one computer.

8. A brake system according to claim 6, wherein the central module displays a voter/monitor for consolidating and monitoring the pedal functions, and a comparison unit is formed which monitors the computers that carry out the higher functions, in which case these functions are switched off if there is a fault, thus creating a fail-silent function.

9. A brake system according to claim 6, wherein the central module feeds redundant output signals from the pedal simulator to at least two separate measurement channels, in which case at least two computers receive the data converted by the measurement channels.

10. A brake system according to claim 1, wherein the data transmission unit between the central module and the wheel modules is a data bus.

11. A brake system according to claim 4, wherein the pedal simulator includes two pedal travel sensors and one pedal force sensor.

12. A brake system according to claim 1, wherein the brake module carries out fault recognition based on local, actuator-specific signals and if it recognizes a fault sends the appropriate message to the brake system, switches itself off, and/or carries out an adjustment of the desired braking value.

13. A brake system according to claim 12, wherein the fault-recognition system is model-supported.

14. A brake system according to claim 1, wherein the brake module includes a switching-off unit separated from a electronic system with access through the central module.

15. A brake system according to claim 1, wherein the central module includes a switching-off unit.

16. A brake system according to claim 15, wherein the switching-off unit is formed as part of a electronic system in the brake module to which the central module has access.

17. Process for controlling an electromechanical brake system comprising the steps of:

redundantly registering multiple signals evidencing that a driver is pressing a brake pedal;

calculating a desired braking value, based on said registered signals;

controlling at least one wheel brake of a brake module based on the desired braking value; and creating a data link between a central module and the brake module, in which case a fault-recognition circuit recognizes any fault in the calculation of the desired braking value.

* * * * *